United States Patent [19]

Lenell

[11] Patent Number: 4,560,843
[45] Date of Patent: Dec. 24, 1985

[54] ELECTRONIC EXTERNAL LINE REPEATER

[75] Inventor: Lars A. Lenell, Saltsjö-Boo, Sweden

[73] Assignee: Telefonaktiebolaget LM Ericsson, Stockholm, Sweden

[21] Appl. No.: 459,977

[22] Filed: Jan. 21, 1983

[30] Foreign Application Priority Data

Feb. 9, 1982 [SE] Sweden .................................. 8200740

[51] Int. Cl.⁴ ............................................... H04B 1/58
[52] U.S. Cl. ........................... 179/170 NC; 179/170 R
[58] Field of Search ......... 179/170 NC, 170 R, 170 T

[56] References Cited

U.S. PATENT DOCUMENTS 4,045,615  8/1977  James et al. ................. 179/18 BC X
4,228,323 10/1980  Feiner et al. ............... 179/170 R X

*Primary Examiner*—James L. Dwyer
*Attorney, Agent, or Firm*—Roberts, Spiecens & Cohen

[57] ABSTRACT

An electronic external line repeater connects a two-wire side to two four-wire sides. The repeater contains two optocouplers (FT1-D1, FT2-D2). A self-compensating negative feedback circuit is connected in accordance with the invention from the two-wire side to the incoming four-wire side. Initial spread and age degradation in the optocoupler (FT2-D2) is thus counteracted. The feedback circuit contains a lowpass filtering and comparing circuit (F3) connected to the line amplifier (F2) of the repeater.

4 Claims, 1 Drawing Figure

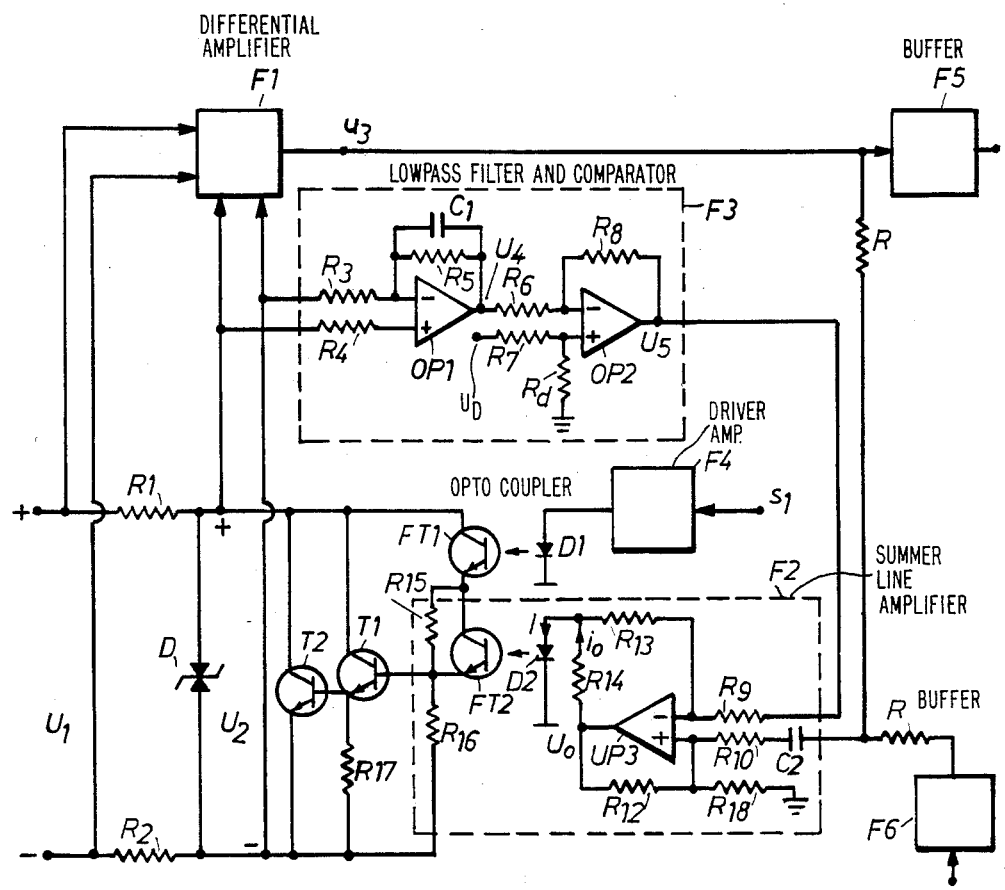

4,560,843

ELECTRONIC EXTERNAL LINE REPEATER

TECHNICAL FIELD

The present invention relates to an electronic external line repeater containing optocouplers with a two-wire side (two-wire input/output) and an incoming and outgoing four-wire side. Such a repeater is used for connecting a two-wire central line to a subscriber exchange.

BACKGROUND ART

Conventional design of external line repeaters has previously utilized a transformer hybrid for isolation between the exchange and the main station. Effective galvanic isolation and good properties regarding balance impedance etc. have thus been obtained. However, these conventional solutions require large space and are furthermore costly, since such a transformer hybrid requires considerable manual work and costs for mechanical attention. For this reason it has been attempted to replace the transformer with electronic components not requiring as much space and affording cheaper solutions. Optocouplers having good isolation ability and including light-emitting diodes (LED) and phototransistors have appeared to be a conceivable replacement for the transformer in these cases. For example, the article "Octocoupler-Based Extension-Line Circuit for Electronic PABX's", IEEE Journal of Solid State Circuits Vol SC-13 No 1, Feb. 1978 describes an external line repeater containing optocouplers for isolation between two-wire side and four-wire side.

DISCLOSURE OF INVENTION

Problems occur in the use of optocouplers, however, due to a lack of aging resistance, i.e. degradation in the coupling factor between LED and phototransistor. Furthermore, the coupling factor initial tolerance is great in the optocouplers available commercially today. These problems are known in the art, and measures have been disclosed, inter alia in the above mentioned IEEE article, for counteracting the degradation due to age.

An object of the present invention is to provide an external line repeater containing optocouplers (LED and phototransistor) arranged between the incoming two-wire side and the four-wire sides of the repeater, a self-compensating reverse feed-back being incorporated in the repeater for counteracting initial spread and age degradation of the optocoupler.

Briefly, the invention contemplates an electronic external line repeater for connecting a two-wire line to a four wire line having incoming and outgoing paths comprising amplifier means connected across the two wire line for feeding speech signals to the outgoing path of the four-wire line, optocoupler means having an output and an input, output amplifier means for connecting the output of said optocoupler means to the two wire line, a self-compensating negative feedback means having an input and an output, high resistance means for connecting the input of said self-compensating negative feedback means to the two wire line, and summing amplifier means having a first input connected to the output of said self-compensating negative feedback means, a second input connected ot the incoming path of said four-wire line and an output connected to the input of said optocoupler means.

BRIEF DESCRIPTION OF DRAWING

The invention will now be described in detail with reference to the appended drawing, whose sole FIGURE illustrates a combined block and circuit diagram for the external line repeater in accordance with the invention.

MODES FOR CARRYING OUT THE INVENTION

In the circuit diagram according to the sole FIGURE, the left-hand end terminal constitutes the two-wire side, across which a voltage $U_1$ appears, in its turn constituting an outgoing or incoming speech signal plus a DC component for supplying current to the repeater. The resistors R1 and R2 are two protective resistors, and the circuit D is an overvoltage protection known per se. Both inputs of a differential amplifier circuit F1 are connected across the two-wire side and across the other side of the protective resistors, for obtaining an output signal $u_3$, which is the difference signal between the voltages $U_1$ and $U_2$ and is solely the speech signal. This is taken via a buffer stage F5 to an outgoing four-wire side formed by the output of the buffer stage F5. The input stage of the differential amplifier circuit F1 consists of an operational amplifier with a high input impedance, the circuit F1 (and the following stages) thus not loading the two-wire side.

The incoming four-wire side is formed by a buffer stage F6 comprising (as with the buffer stage F5) an operational amplifier circuit of known embodiment. A feed-back loop is formed by the amplifier circuit F1 and a resistor RF to a line amplifier circuit F2 to achieve the desired AC impedance, seen from the two-wire side. This feed-back loop is described in the Swedish Patent Application No. 8200741-0 and is not the subject of this invention. The line amplifier circuit F2 primarily has the task of receiving the speech signal from the four-wire side (the buffer stage F6) and converting it into a current, which, via the optocoupler, gives a transversal speech voltage across the two-wire side. In the embodiment illustrated here, the line amplifier circuit F2 includes an operational amplifier UP3, the plus input of which forms a first input via a resistor R9 and, via a resistor R10 and a capacitor $C_2$, a minus input forming a second input in the line amplifier circuit. The output of the amplifier UP3 is connected via a resistor R14 to a LED D2, optically coupled to a photoresistor FT2. The operational amplifier UP3, is together with the resistor R14 connected as a voltage-current converter and converts the speech component $u_o$ of the output voltage $U_o$ to the corresponding speech current $i_o$. The bias current I to the LED is obtained by the voltage-current convertion of the DC component in the output voltage $U_o$. The diode D2 and phototransistor FT2 constitute a unit, which cannot withstand high voltages, but which is linear within a given working range. An example of such an optocoupler is the General Electric H11F1, which works linearly at a suitably selected working point determined by a given bias current I, i.e., the potential drop across the phototransistor FT2 on the two-wire side varies linearly in relation to the speech current, which has the bias current I superposed to the LED D2. A second optocoupler includes the LED D1 and the phototransistor FT1, the latter being connected in series with the phototransistor FT2. This optocoupler is not linear but withstands the high voltages which can occur, e.g., those occurring in connecting ringing signals to the repeater. The resistors R15 and R16, connected across the phototransistor FT2 and to one terminal (via the resistor R2) of the two-wire side, determine the operating point for an output drive stage T1, T2. Furthermore, the resistor R15 protects the phototransistor FT2 against high voltages.

The problem intended to be solved with the aid of the present invention is to counteract initial spreading and age degradation of the coupling factor, primarily of the optocoupler D2-FT2. For this purpose, a lowpass filtering and comparing circuit block F3 is arranged, the input being connected to the output of the drive stage T1, T2, i.e., to the collector-emitter output of the transistor T2. The output of the circuit F3 is directly connected to the first input of the circuit F2. The circuit F3 contains an integrating circuit consisting of an operational amplifier OP1, the input resistors R3, R4 and the resistor-capacitor link R5, C1. The integrating circuit senses the output voltage $U_2$ from the drive stage T1, T2, such voltage containing a DC component and an AC component (the speech signal). A voltage is thus obtained across the amplifier OP1 which is the voltage $U_2$ integrated over a given time interval. Since the speech component varies about the DC component of $U_2$, this component will on average be zero on integration, and a lowpass filtered signal $u_4$ is obtained from the voltage $U_2$.

The circuit F3 further contains an adder circuit including the operational amplifier OP2 together with the resistors R6, R7 and R8. A further resistor $R_d$ is connected between an earthing point and the minus input. The resistor R6 is connected to the minus input of the operational amplifier and to the output of the amplifier. The resistance R7 is connected to the plus input and to a direct voltage Ud. The feedback resistor R8 connects the minus input to the output of the amplifier OP2. Across the output of the operational amplifier OP2 there is obtained a difference voltage $U_5 = R8/R6(U_4 - Ud)$ if $R6 = R7$ and $R_d = Ru$, this voltage being taken to the minus input of the operational amplifier OP3 in the circuit F2. If the direct voltage component of the output voltage $U_2$ increases with time due to age degradation of the coupling factor in the optocoupler D2-FT2, the lowpass filtered output voltage $U_4$ will increase, resulting in that signal $U_5$ will decrease and the DC component I to the input of the LED D2 will increase. The LED D2 thus emits more and more photons (the light intensity increases) to the phototransistor FT2, which in turn becomes more and more conductive, the voltage $U_2$ decreasing. The resistors R12 and R18 stabilize the operational amplifier towards an earth potential.

The circuit F4 represents a drive stage suitably containing a feedback operational amplifier for the LED D1 included in the high-voltage-resistant optocoupler D1-FT1. A signal determining the line state, high- or low-ohmic loop, is applied across the input $s_1$ of the circuit F4. For a high-ohmic loop (i.e. the rest state) the signal input $s_1$ is such that the optocoupler D1-DF1 is not activated and the phototransistor FT1 is blocked. When the input $s_1$ is activated, the diode D1 obtains current and the phototransistor FT1 is conductive, whereby the photocoupler D2, FT2 is activated to connect speech signals from the receiver path of the four-wire side.

Both optocouplers D1, FT1 and D2, FT2 have too small a coupling factor and drive capacity of the respective output transistor for being able to drive the two-wire loop directly. To take care of this, the couplers have been supplemented by the high-voltage-resistant and also linearly operated Darlingtontype output stage T1, T2. It is of interest to note here that the conduction voltage of the output transistor T2 is low and that the current lowering ability in a conducting state is sufficiently good so that the series impedance during impulsing can be kept low.

What is claimed is:

1. An electronic external line repeater for connecting a two-wire line to a four-wire line having incoming and outgoing paths comprising amplifier means connected across the two wire line for feeding speech signals to the outgoing path of the four-wire line, optocoupler means having an output and an input, output amplifier means for connecting the output of said optocoupler means to the two wire line, a self-compensating negative feedback means having an input and an output, high resistance means for connecting the input of said self-compensating negative feedback means to the two wire line, and summing amplifier means having a first input connected to the output of said self-compensating negative feedback means, a second input connected to the incoming path of said four-wire line and an output connected to the input of said optocoupler means.

2. The line repeater of claim 1 wherein said self-compensating negative feedback means comprises low pass filtering means for filtering the voltage across the two-wire line and comparator means for comparing the filtered voltage with a direct voltage to provide a filtered voltage less a given DC voltage.

3. The line repeater of claim 2 wherein said optocoupler means comprises a first and second optocoupler each having an input and an output, said first optocoupler being high-voltage resistant, said second optocoupler being linear, means for connecting the outputs of said optocouplers in series to said output amplifier means, means for connecting the input of said first optocoupler to a control signal for controlling the operation of said second optocoupler via said first optocoupler.

4. The line repeater of claim 3 wherein said output amplifier means is a Darlington amplifier.

* * * * *